United States Patent
Luitjens et al.

(10) Patent No.: US 7,406,011 B2
(45) Date of Patent: Jul. 29, 2008

(54) RECORDING MEDIUM AND METHODS OF AND DEVICE FOR RECORDING INFORMATION ON THE RECORDING MEDIUM

(75) Inventors: Steven Broeils Luitjens, Eindhoven (NL); Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 580 days.

(21) Appl. No.: 10/494,188

(22) PCT Filed: Oct. 22, 2002

(86) PCT No.: PCT/IB02/04411

§ 371 (c)(1),
(2), (4) Date: Apr. 30, 2004

(87) PCT Pub. No.: WO03/040993

PCT Pub. Date: May 15, 2003

(65) Prior Publication Data

US 2004/0264337 A1    Dec. 30, 2004

(30) Foreign Application Priority Data

Nov. 5, 2001 (EP) .................................. 01204238

(51) Int. Cl.
*G11B 7/00* (2006.01)
*G11B 15/52* (2006.01)
(52) U.S. Cl. ............... 369/53.17; 369/47.14; 369/53.15
(58) Field of Classification Search ............. 369/47.14, 369/53.17, 53.15, 47.16, 47.52, 59.25, 53.21, 369/275.1, 275.3; 714/8, 7, 711, 723, 719
See application file for complete search history.

(56) References Cited

U.S. PATENT DOCUMENTS

| | | | | |
|---|---|---|---|---|
| 6,189,118 B1 * | 2/2001 | Sasaki et al. | ................. | 714/710 |
| 6,292,445 B1 * | 9/2001 | Ito et al. | .................. | 369/47.14 |
| 6,408,408 B1 * | 6/2002 | Ko | .............................. | 714/710 |
| 6,414,923 B1 * | 7/2002 | Park et al. | ................ | 369/53.15 |
| 6,453,384 B1 * | 9/2002 | Park et al. | .................... | 711/112 |
| 6,463,024 B1 * | 10/2002 | Park | ........................ | 369/53.35 |
| 6,469,978 B1 * | 10/2002 | Ohata et al. | .............. | 369/275.3 |
| 6,526,522 B1 * | 2/2003 | Park et al. | ....................... | 714/8 |
| 6,564,338 B1 * | 5/2003 | Sasaki et al. | .................. | 714/5 |
| 6,741,534 B1 * | 5/2004 | Takahashi et al. | ......... | 369/47.14 |
| 6,963,523 B1 * | 11/2005 | Park | ........................ | 369/47.14 |
| 2001/0026511 A1 * | 10/2001 | Ueda et al. | ............... | 369/47.14 |

* cited by examiner

*Primary Examiner*—Ali Neyzari

(57) ABSTRACT

The invention relates to a recording medium (2), particularly an optical recording disk, which comprises at least one record track (3) having a physical volume (32) with addressable blocks (4). The physical volume (32) is divided into spare area (36;38) and user-accessible logical volume (37). A single spare area (36) is only located at the beginning of the physical volume (32), or a single spare area (38) is only located at the end of the physical volume (32). Alternatively, a first spare area (36) is located at the beginning of the physical volume (32) and a second spare area (38) is located at the end of the physical volume (32). Thus, the logical volume (37) is physically contiguous, that is, not interrupted by any spare area. The recording medium according to the invention can be used both for storing computer data as well as for recording audio and/or video information. The invention also relates to methods and a device for use in conjunction with the recording medium.

15 Claims, 2 Drawing Sheets

RECORDING MEDIUM AND METHODS OF AND DEVICE FOR RECORDING INFORMATION ON THE RECORDING MEDIUM

The present invention relates in general to the recording of information, particularly digital information, on a disk-shaped recording medium such as an optical disk or a magnetic disk, hereinafter also referred to as "recording disk". More particularly the present invention relates to a recording disk which can be used in two or more different recording systems. Especially, but not exclusively, the present invention relates to Digital-Video-Recorder (DVR) disks.

Known recording disks have a multitude of concentric, substantially circular, recording tracks. The recording tracks may take the form of individual circular tracks or of one or more contiguous spiral tracks. In the following it will be assumed that the recording disk has one single contiguous track, but it will be clear that the invention is not limited to this situation. The track is divided into a large number of logic blocks, each logic block having a unique address (i.e. a block address). In principle, each block is individually addressable and information can be stored into and retrieved from individual blocks. In practice, however, such a block address is not known to a user. When a user wishes to record information on the recording disk, a recording apparatus writes the information in a free, usable block. In a certain area on the disk, specifically reserved for this purpose, a table is stored in which the location of the information is noted. Upon retrieval of the information, a read apparatus reads the table in order to know where to look for the information. However, this is transparent to a user.

In an ideal situation, all blocks are usable. In such a case, during a recording operation, information is written in subsequent blocks, all blocks being physically adjacent to their neighbours. However, in practice a disk may exhibit defective blocks, that is, blocks where faultless recording of information is not possible or where small write errors cannot be corrected during reading. Such a defective block is no longer suitable for recording. When this defective status of a block is known before-hand, its address is listed in a defect list and the block can simply be skipped when writing and reading.

However, it may also be that the defective status is detected only during recording. For this situation it is customary to reserve a spare area on the recording disk. This spare area cannot be addressed by the user and is intended for replacement of any defective blocks. Thus, when during recording a defective block is found, recording is effected in a block of the spare recording area instead of in the defective block. The location or address of the replacement block used instead of the originally intended block is noted in a replacement file. During read-back, it is now possible to read the complete file, including the information recorded in the replacement block.

In principle, the replacement recording in the replacement block in the spare area is used only with respect to said defective block. After recording of a data packet in a block of the spare recording area, the recording of the following data packets is continued in a normal block following the defective block in the normal recording area. This implies that the principle of replacement recording in a spare area involves two jumps of the recording head during recording. Likewise two jumps of the read head are required to read the information. In order to keep the jump distance relatively small, the spare area is in general distributed as spare area sections over the entire length of the track. It is to be noted that the recording head and the read head may be combined into a single device.

The principle of replacement recording in a spare area is satisfactory for the case where the information to be stored is, for example, computer data. For this situation, where the recording disk can be regarded as an instrument of memory for a computer, the temporal behaviour of the data flow is not critical. However, nowadays the recording disk is also used as a storage medium for storing audio and/or video (AV) in a digital format. During recording, as well as during read back, it is important that the data flow is not interrupted. A relatively short interruption of the writing process or the reading process can be handled by buffering the data flow. However, the jumps of the read head or the write head from the normal recording area to the spare recording area and back take a relatively long time, even to such an extent that the principle of replacement recording in a spare area is not well suited for use in situations where the real time behaviour of the data flow is important. Therefore, in the case of applications where real-time behaviour of data flow is important, usually no spare area is reserved on the track at all. The presence of any spare area section would have resulted in the disadvantage that the recording head or the read head, respectively, when reaching such a spare area section, needs to jump over such spare area which results in an interruption of the recording process or the reading process, respectively.

Thus, two important standards have been developed: one for computer data use and one for audio/video data use. In the first system a track contains spare area sections distributed over the track while in the second system a track is free from such spare area sections. The aforementioned standards are incompatible. If a recording disk has been formatted for use in an environment where the real time behaviour of the data flow is important, such as an audio/video environment, such a recording disk cannot be used for data storage in a computer because in such an application the presence of a spare area is expected. Conversely, if a recording disk has been formatted for use in a computer, such a disk can no longer be used be used anymore in an application where the real time behaviour of the data flow is important, such as an audio/video application, because of the presence of the spare areas distributed over the length of the track.

It is an object of the present invention to solve this problem. More particularly, the present invention aims to provide a recording disk which can be used in a personal computer or similar system where the presence of a spare area is required, as well as in an audio/video recorder apparatus or similar system where the real time behaviour of data flow is important and would only be hampered by the presence of a spare area. It is a further object of the present invention to provide a method of and a device for recording information on such a recording disk according to the invention.

These objects are achieved by providing a recording medium according to claim 1, by providing a method according to any one of the claims 10, 12, 13 or 14, and by providing a device according to claim 15.

According to an important aspect of the present invention, a recording disk comprises both a user-accessible area and a spare area, but the spare area is located at an edge of the user-accessible area so that the user-accessible area is not interrupted by any spare area.

These and other aspect, features and advantages of the present invention will be explained in more detail, by way of example, in the following description of preferred embodiments of the invention with reference to the drawings, in which.

Figure 1:
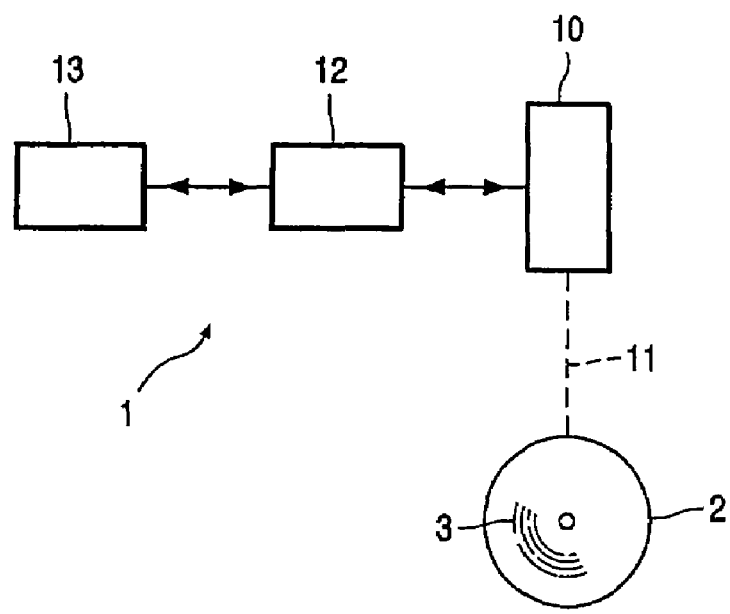
FIG. 1 is a functional block diagram showing part of a recording apparatus.

FIG. 1 is a functional block diagram showing a part of a recording apparatus 1 suitable for writing information on a recording medium 2. In the following it will be assumed that the recording medium 2 is an optical recording disk and that the apparatus 1 is an optical recording apparatus. However, the present invention is not limited to this field; to the contrary, the present invention is also applicable to, for example, magnetic recording.

The recording disk 2 has a recording track 3 which is assumed to be one contiguous spiral track hereinafter. Although such an implementation is preferred, the present invention is not limited to such an implementation; to the contrary, the present invention is also applicable to disks where the track 3 is implemented as two or more spiral tracks and to disks where the track 3 is implemented as a multitude of individual mutually concentric circular tracks. In literature, each individual circular track of this kind is sometimes referred to as a "track", in which terminology a disk would have more than one track. Unless specifically indicated otherwise, this distinction is not made and the overall length of the recordable space will be indicated as one track hereinafter.

For performing a write operation or a read operation, the apparatus 1 has an optical write/read head 10 and a turntable which is not shown for the sake of simplicity and which faces the head 10. The disk 2 can be positioned on the turntable and thus be given a rotational movement with respect to the head 10, thus enabling the track 3 to be scanned by the head 10. Information is written in the track by means of a radiation beam such as a laser light beam 11. Since the process of optically writing and reading information is known per se, it will not be explained here any further.

Figure 2:
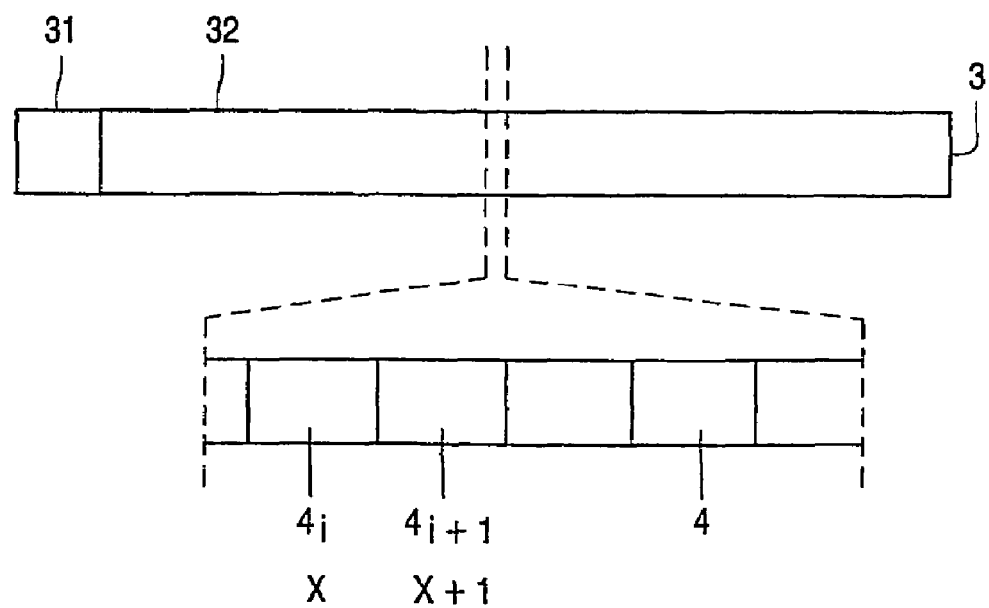
FIG. 2 shows diagrammatically the logic structure of a recording disk in a general manner.

FIG. 2 schematically shows that the recording track 3 comprises logic blocks 4. Each block has a unique address which has been recorded in a predetermined address field of such block. Thus, it is possible to store information directly at a given location corresponding to a given address on the disk 2, and it is likewise possible to retrieve the information directly from a given location corresponding to a given address. FIG. 2 also illustrates that the numbering of subsequent blocks is consecutive. This means that if a certain block $4_i$ has address X, the next block $4_{i+1}$ has address X+1.

The write process and the read process are controlled by a functional unit 12 in the recording apparatus 1, referred to hereinafter as the write control unit. The write control unit 12 controls the positioning of the head 10 with respect to the disk 2 and controls the laser beam 11 for performing a write operation or a read operation in one or more specified addressable logic blocks 4. The recording apparatus 1 also has a functional unit 13, referred to hereinafter as the allocation manager. The allocation manager 13 determines where a recording operation is to take place. More specifically the allocation manager 13 determines the addresses of the logic blocks which are to be used for recording. When a user starts a recording operation, the allocation manager 13 determines whether there is enough space for the recording on the disk 2 and which part of the track 3 is available for recording. Since a write control unit 12 and an allocation manager 13 are known per se, they will not be described here any further.

In principle, information can be recorded anywhere on the track 3. However, in general not the entire track 3 is available for recording by a user. A predetermined area 31 is reserved for allowing the system to store information relating to the contents of the disk 2. This information may relate to, for example, the number of files on the disk 2, the start addresses of the files, the length of the files, the names of the files, etc. This area 31 will be referred to hereinafter as the administrative area. The remainder of the track 3 is in general available for storing information by a user. This remainder will be referred to hereinafter as the physical volume 32 of the track 3.

Figure 3:
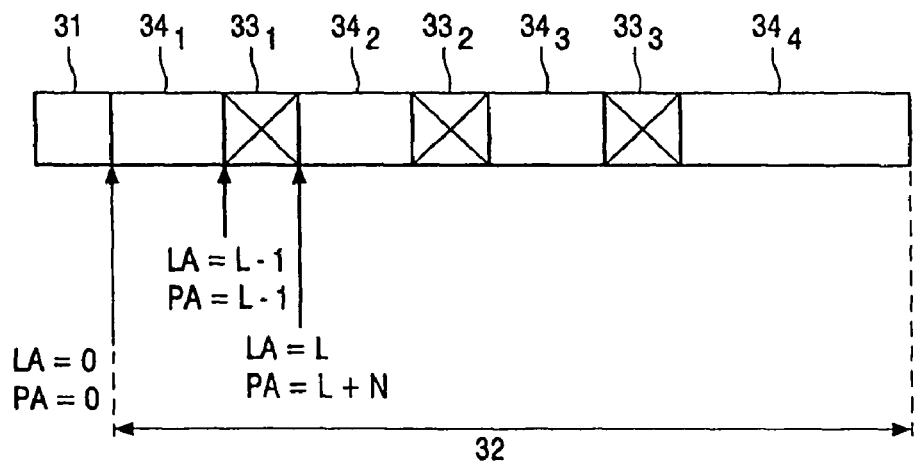
FIG. 3 shows diagrammatically in detail the logic structure of a recording disk according to the prior art.

In the case of applications where the real time behaviour of the information flow is important, the track 3 does not comprise any spare areas and the complete physical volume 32 is available as user area. The schematic drawing of FIG. 2 is illustrative of this situation. Conversely, in an application for storing digital data files, where the real-time behaviour is less important, the physical volume 32 contains a number of spare areas 33 distributed over the length of the physical volume 32. The schematic drawing of FIG. 3 is illustrative of this situation. FIG. 3, shows only three spare areas $33_1$, $33_2$, $33_3$, but in practice the number of spare areas is much larger.

The blocks in the spare areas 33 have addresses and as such are addressable blocks which are physically accessible by the system. However, the addressable blocks in the spare areas 33 are not directly accessible by a user; therefore, each spare area is schematically indicated by a cross in the FIGS. 3 and 4. A distinction is made between a physical volume 32 and a logical volume 34 which is defined as that part of the physical volume 32 not occupied by a spare area 33. It can be seen in FIG. 3 that the logical volume 34 consists of a number of logical volume segments separated by spare areas 33. FIG. 3 shows four of those logical volume segments $34_1$, $34_2$, $34_3$, $34_4$.

Hereinafter an analogous distinction will be made between logical address LA and physical address PA. The logical address LA of an addressable block is an address in the logical volume 34, whereas a physical address PA is the address of a block in the physical volume 32. Due to the presence of the spare areas 33, those addresses are not identical. More in particular, the addressable blocks within the spare areas 33 do not have an address in the logical volume, and hence they do not have a logical address. In FIG. 3, numbering of the addressable blocks 4 starts at the left-hand side of the physical volume 32 with the physical address PA=0, while the same block also has the logical address LA=0. The next blocks have the addresses 1, 2, 3, . . . . Assuming that the number of addressable blocks within the first logical segment $34_1$ equals L, then the last block in the logical segment $34_1$ has the logical address LA=L-1. The first addressable block in the next logical segment $34_2$ has the logical address LA=L. When writing a file containing more than L blocks, subsequent blocks of such a file always have subsequent logical addresses. However, in the physical volume such is not the case. The physical address PA=L is, in this example, the address of the first addressable block in the first spare area $33_1$. If the first spare area $33_1$ contains N blocks, the first addressable block within the second logical segment $34_2$ has the physical address PA=L+N; thus, in this case, the logical address LA=L corresponds to the physical address PA=L+N.

Now, it should be clear that a one-to-one relationship exists between the logical address LA and the physical address PA; if a certain block $4_i$ has a logical address LA=X, it also has a physical address PA=Y (it should be noted that the reverse reasoning is not correct). If this relationship is known, it is possible to calculate the physical address PA from the logical address LA. Hereinafter, this relationship is expressed by the following expressions. Let $LA(4_i)$ indicate the logical address of a block $4_i$. Let $PA(4_i)$ indicate the physical address of this block $4_i$. Let PA[LA] indicate the physical address PA of the block having logical address LA. Now:

$$PA[LA(4_i)]=PA[X]=PA(4_i)=Y$$

Hereinafter, the phrase "physically contiguous" will be used to refer to a track portion where all blocks 4 have consecutive physical addresses. In other words, for each pair of two subsequent blocks $4_i$ and $4_{i+1}$ within such a physically contiguous track portion, having consecutive logical addresses $LA(4_i)=X$ and $LA(4_{i+1})=X+1$, the physical addresses $PA(4_i)$ and PA $(4_{i+1})$ are also consecutive. This is expressed by the following expression:

$$PA[LA+1]-PA[LA]=1 \qquad \text{(expression 1)}$$

Using the above definition of the phrase "physically contiguous" to describe the prior art logic structure illustrated in FIG. 3, it should be clear that each logical segment $34_i$ is physically contiguous by itself but that the logical volume 32 as a whole is not physically contiguous. For instance, for the last block in the first logical segment $34_1$, having the logical address LA=L−1, the expression 1 would yield:

$$PA[LA+1]-PA[LA]=(L+N)-(L-1)=N+1$$

When an optical recording disk 2 has been newly manufactured, it physically comprises the track 3 and is, therefore, suitable for recording, but the distinction of individual addressable blocks, the allocation of addresses to the blocks, the distinction between physical volume and administrative area, and the definition of spare area etc., has not yet been implemented. This so-called formatting is performed the first time that a disk is introduced into a writing apparatus. Depending on the type of writing apparatus, the apparatus performs a certain type of formatting; if the apparatus forms part of a system for recording audio and/or video, the formatting will be performed in accordance with the schematic illustration of FIG. 2. A disk formatted for audio/video application cannot be used for standard data storage unless the disk is reformatted, which involves loss of previously recorded information. If the first writing apparatus is, for example, a personal computer, the apparatus may offer the user a choice between formatting for audio/video applications on the one hand and formatting for data storage on the other hand. If the user chooses formatting for data storage, the formatting will be performed in accordance with the schematic illustration of FIG. 3; now the disc cannot be used for recording audio and/or video unless the disk is reformatted, which involves the loss of previously recorded information.

The present invention proposes a different type of formatting, allowing a disk formatted in accordance with the present invention to be used in a computer system for storing data but also in a consumer apparatus for recording audio and/or video. An important aspect is that the disk formatted in accordance with the present invention should be usable in existing apparatus, which means that adaptations of the writing apparatus or of the reading apparatus should not be necessary. In other words, the formatting should be compatible with the standardized formatting for data storage on the one hand and also with the standardized formatting for audio/video applications on the other hand. This object is achieved in accordance with the present invention by combining a spare area with an uninterrupted logical area. This is illustrated in the FIGS. 4A-4C.

Figure 4A:
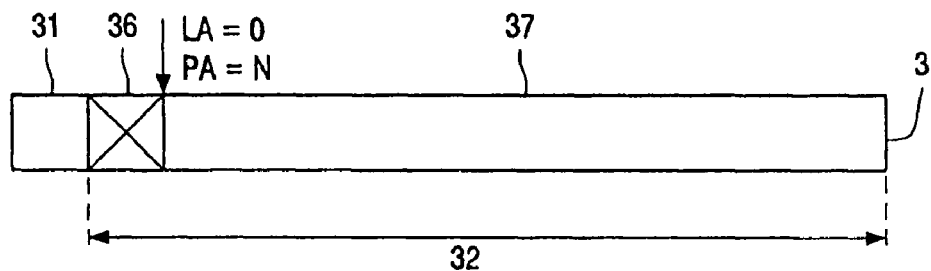
FIGS. 4A to 4C show diagrammatically the logic structure of a recording disk according to the present invention.

FIG. 4A illustrates a recording track 3 having an administrative area 31 and a physical volume 32. The physical volume 32 comprises one spare area 36 at the beginning of the physical volume 3 and one physically contiguous user-accessible area 37. It is to be noted that the beginning of a track 3 usually is situated at the innermost extremity of such a track. The first addressable block of the logical volume 37, having the logical address LA=0, is adjacent to the last block in the spare area 36. Assuming that the spare area 36 contains N blocks, the first addressable block of the logical volume 37 has the physical address PA=N. A disk having a track 3 formatted as illustrated in FIG. 4A can be used for recording audio/video files in the logical volume 37 without the problems of the state of the art, as illustrated by FIG. 3, because the logical volume 37 is a one-piece volume not interrupted by any spare area. On the other hand, the disk having a track formatted in accordance with FIG. 4A can also be used for recording computer data or the like, because the track 3 does comprise a spare area 36.

Figure 4B:
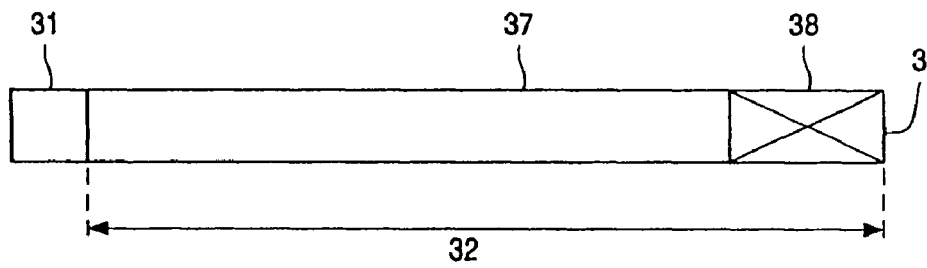

FIG. 4B illustrates, in a manner similar to FIG. 4A, a second embodiment of the present invention. Again, the track 3 comprises one spare area 38 and one physically contiguous volume 37 not interrupted by any spare area. In this case the spare area 38 is located at the end of the physical volume 32. Thus, the logical address LA=0 for the first addressable block within the logical volume 37 corresponds to physical address LA=0 of the first addressable block in the physical volume 32, while the first addressable block within the spare area 38 is adjacent to the last addressable block within the logical volume 37. It will be clear to a person skilled in the art that a disk having a track 3 formatted in accordance with FIG. 4B can be used for recording audio/video files as well as for recording computer data files, as explained above with reference to FIG. 4A. In both embodiments described above computer data files and audio/video files can be recorded in a mixed way in the same logical volume 37 without the two types of files hindering each other.

In the case of audio/video applications a disk is full when the logical volume 37 is full, even if the spare area 36, 38 is not yet full. Likewise, in the case of computer applications a disk is full if the logical volume 37 is fill even if the spare area 36, 38 is not yet full. However, now the disk is also said to be full when the spare area 36, 38 is full even if the logical volume 37 is not yet full. In both cases it may be desirable to amend the amount of spare area after the initial formatting. In the first embodiment illustrated in FIG. 4A, amending the amount of spare area 36 has direct consequences for the addresses of the addressable blocks in the logical volume 37, because the location of the logical address LA=0 changes. In other words, after amending the amount of spare area 36, all addressable blocks within the logical volume 37 have obtained a different address. This means that, even if their contents is not changed, it is in general no longer possible to retrieve the contents because the addresses have changed.

This problem does not occur in the second embodiment illustrated by FIG. 4B in which the spare area 38 is located at the end of the logical volume 37. If the amount of spare area 38 is amended, addressable blocks at the end of logical volume 37 may become lost. However, all addressable blocks within the logical volume 37 remaining after the amending of the spare area still have the same address and the same contents as before, so that files already stored are still accessible. For this reason, the second embodiment, illustrated by FIG. 4B, is preferred over the first embodiment of FIG. 4A.

A third embodiment of the invention combines the first and the second embodiments. In this third embodiment, illustrated by FIG. 4C, the physical volume 32 has a physically contiguous logical space 37 with a first spare area 36 at the beginning and a second spare area 38 at the end. In the context of the present invention it is important that the logical volume 37 is physically contiguous, that is, not interrupted by any spare area.

Figure 4C:
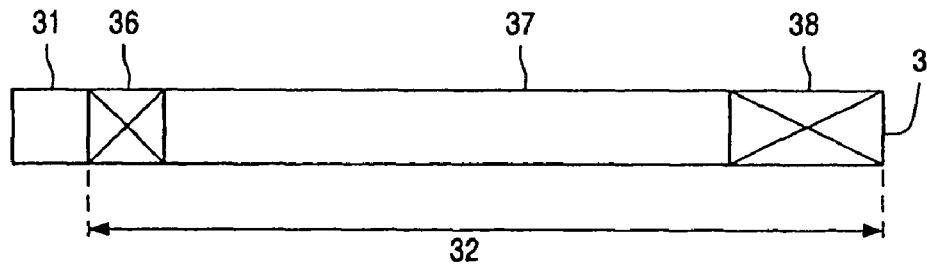

It is to be noted that in the FIGS. 4A-4C the relative storage capacities of the logical volume 37 and the spare areas 36 and 38 are not shown to scale; in general, the size of the spare area amounts to only a few percents of the size of the logical volume 37.

As explained before, the spare areas are defined during first time initialization of the disk, that is, during formatting of the disk. At such a moment it is possible to ask for user input with respect to the size of the spare areas. A user who is solely interested in storing computer data may wish to have more spare area space available than a user who is solely interested in recording audio/video files. However, in order to ensure that the disk is always usable for storing computer data as well as for storing audio/video files, in a preferred embodiment the disk 2 always has a first spare area 36 having a fixed predetermined size, for example, about 1% of the size of the physical volume 52. This ensures that there is always at least some spare area for use in computer applications. During formatting, a user may wish to have a relatively large spare area in which case a relatively large second spare area 38 is defined, for example, about 5% of the size of the physical volume 32, or the user may wish to have a relatively small spare area, in which case a relatively small spare area 38 may be defined or the second spare area 38 may be omitted all together. As explained above, the user may later wish to increase or decrease the size of the spare area, in which case the size of the second spare area 38 is increased or decreased, respectively, while the size of the first spare area 36 is left unchanged. Because of this, the overall size of the spare area can never become zero.

It should be clear to a person skilled in the art that the present invention is not limited to the examples discussed above, but that several amendments and modifications are possible without departing from the scope of the invention as defined in the appended claims. For example, the track may comprise further reserved areas whose use is reserved for specific purposes at a system level or at an application level. Such a further reserved area may, for example, be located at the beginning or at the end of the physical volume 32, or at the beginning or at the end of the logical volume 37. Furthermore, the track 3 may comprise so-called lead-in areas and/or lead-out areas as will be clear to a person skilled in the art. The important aspect in the context of the present invention is that the logical volume 37 does not have blocks logically adjacent but blocks physically separated by blocks belonging to a spare area. Preferably, all blocks are spatially adjacent, that is, the logical volume 37 is completely free from any interruptions.

The invention claimed is:

1. A recording medium comprising a single recordable area comprising an administrative area and a physical volume of addressable logic blocks, said physical volume being subdivided into one physically contiguous logical volume formatted to store computer data and audio and audio/video data; and a spare area formatted to replace a defective area of the physically contiguous volume unrelated to the audio and audio/video data, said spare area being located at the beginning or the end of the physical volume and being adjacent to the physically contiguous logical volume, wherein the administrative area and the physical volume fill the single recordable area.

2. The recording medium as claimed in claim 1, wherein said spare area is located at the beginning of the physical volume.

3. The recording medium as claimed in claim 1, wherein said spare area is located at the end of the physical volume.

4. The recording medium as claimed in claim 1, wherein said recording medium further comprises a further spare area, wherein said spare area is located at the beginning of the physical volume, and wherein said further spare area is located at the end of the physical volume also adjacent to said physically contiguous logical volume.

5. A method for formatting a recording medium comprising a single recordable area, the recording medium comprising a physical volume of addressable blocks, the method comprising acts of:
   defining within the physical volume one physically contiguous logical volume and a spare area adjacent to said physically contiguous logical volume, said spare area being located at the beginning of the physical volume,
   formatting said physically contiguous logical volume to store computer data and audio and audio/video data, and
   formatting said spare area to replace a defective area of the physically contiguous volume data unrelated to the audio and audio/video data, wherein an administrative area and the physically contiguous volume fill the single recordable area.

6. A method for formatting a recording medium comprising a single recordable area, the recording medium comprising a physical volume of addressable blocks, the method comprising acts of:
   defining within the physical volume one physically contiguous logical volume and a spare area adjacent to said physically contiguous logical volume, said spare area being located at the end of the physical volume,
   formatting said physically contiguous logical volume to store computer data and audio and audio/video data, and
   formatting said spare area to replace a defective area of the physically contiguous volume data unrelated to the audio and audio/video data, wherein an administrative area and the physically contiguous volume fill the single recordable area.

7. A method for formatting a recording medium comprising a single recordable area, the recording medium comprising a physical volume of addressable blocks, the method comprising acts of:
   defining within the physical volume one physically contiguous logical volume, a first spare area located at the beginning of the physical volume and adjacent to the physically contiguous logical volume, and a second spare area located at the end of the physical volume and adjacent to the physically contiguous logical volume,
   formatting the physically contiguous logical volume to store computer data and audio and audio/video data, and
   formatting the first spare area to replace a defective area of the physically contiguous volume unrelated to the audio and audio/video data, wherein an administrative area and the physically contiguous volume fill the single recordable area.

8. The method for formatting a recording medium as claimed in claim 7, wherein the method further comprises a step of:
   adapting the size of the second spare area in dependence on user input.

9. A device for writing information on a recording medium, the device comprising:
   a write/read head for writing/reading information on/from said recording medium;
   a write control unit for controlling a write process and a read process; and an allocation manager for determining where information is to be written on said recording medium, wherein the write control unit and the allocation manager are adapted to perform a method for formatting a recording medium comprising a single recordable area as claimed in claim 5.

10. The device as claimed in claim 9, wherein the write control unit and the allocation manager are further adapted to adapt the size of a second spare area in dependence on user input.

11. The method for formatting a recording medium as claimed in claim 7, wherein the method further comprises a step of:

formatting the second spare area to replace a defective area of the physically contiguous volume data unrelated to the audio and audio/video data.

12. The recording medium as claimed in claim 1, wherein the administrative area and the physical volume are physically contiguous.

13. The method as claimed in claim 5, wherein the administrative area and the physical volume are defined to be physically contiguous.

14. The method as claimed in claim 6, wherein the administrative area and the physical volume are defined to be physically contiguous.

15. The method as claimed in claim 7, wherein the administrative area and the physical volume are defined to be physically contiguous.

* * * * *